(12) United States Patent
Kukharev

(10) Patent No.: US 11,054,539 B2
(45) Date of Patent: Jul. 6, 2021

(54) METHODS OF SEARCHING FOR MINERAL RESOURCES BY ANALYZING GEOCHEMICAL AND OTHER ANOMALIES DURING GRAVITATIONAL RESONANCES

(71) Applicant: Vadim Kukharev, Moscow (RU)

(72) Inventor: Vadim Kukharev, Moscow (RU)

(*) Notice: Subject to any disclaimer, the term of this patent is extended or adjusted under 35 U.S.C. 154(b) by 98 days.

(21) Appl. No.: 16/711,752

(22) Filed: Dec. 12, 2019

(65) Prior Publication Data
US 2021/0132249 A1     May 6, 2021

Related U.S. Application Data

(60) Provisional application No. 62/927,984, filed on Oct. 30, 2019.

(51) Int. Cl.
| | | |
|---|---|---|
| *G01V 3/08* | (2006.01) | |
| *G06F 16/29* | (2019.01) | |
| *G06F 17/13* | (2006.01) | |

(52) U.S. Cl.
CPC .............. *G01V 3/082* (2013.01); *G01V 3/081* (2013.01); *G01V 3/087* (2013.01); *G06F 16/29* (2019.01); *G06F 17/13* (2013.01)

(58) Field of Classification Search
CPC ........ G01V 3/082; G01V 3/081; G01V 3/087; G01V 7/00; G01V 7/005; G01V 2210/6165; G06F 16/29; G06F 17/13
(Continued)

(56) References Cited

U.S. PATENT DOCUMENTS

| 5,040,414 A * | 8/1991 | Graebner ................ E21B 47/00 73/152.59 |
| 5,137,830 A * | 8/1992 | Milly .................. G01N 33/241 367/60 |

(Continued)

FOREIGN PATENT DOCUMENTS

WO    WO-2014168596 A1 *   10/2014   ............... G01V 3/14

OTHER PUBLICATIONS

Author—Unknown; Title—Tide Formation—Gravitation Pull, Jul. 29, 2016 https://manoa.hawaii.edu/exploringourfluidearth/physical/tides/tide-formation-and-gravitational-pull (Year: 2016).*
(Continued)

*Primary Examiner* — Patrick Assouad
*Assistant Examiner* — Sean Curtis
(74) *Attorney, Agent, or Firm* — Nadya Reingand; Yan Hankin

(57) ABSTRACT

Disclosed are methods for locating deposits of mineral resources below the Earth's crust. A period of resonance of 14-day gravitational tides is predicted based on known information about a location. During the period of resonance, element vapor emissions and/or other data are recorded using gas analyzers and/or other devices, which are spread in an array over the location. The vapors and/or other data are recorded for a period of about 3-4 days. The recorded data is analyzed to determine when and where any anomalies exist. By comparing anomalies to control data, the changes can be further extrapolated to obtain more accurate data. After anomalies are detected and analyzed, the locations of deposits comprising mineral resources can be determined and maps of the locations correlating to the surface are generated.

20 Claims, 8 Drawing Sheets

(58) Field of Classification Search
USPC .................................................. 324/72, 348
See application file for complete search history.

(56) References Cited

U.S. PATENT DOCUMENTS

| | | | | |
|---|---|---|---|---|
| 5,159,833 | A * | 11/1992 | Graebner | E21B 47/00 73/152.39 |
| 7,240,550 | B2 * | 7/2007 | Raffalt | G01F 23/00 73/313 |
| 7,562,571 | B2 * | 7/2009 | Raffalt | G01F 23/00 73/313 |
| 8,201,448 | B2 * | 6/2012 | French | G01V 7/16 73/383 |
| 9,541,672 | B2 * | 1/2017 | Edwards | G01V 7/00 |
| 10,072,500 | B2 * | 9/2018 | Dyatlov | E21B 49/087 |
| 10,330,577 | B2 * | 6/2019 | Kim | E21B 41/0064 |
| 10,520,615 | B1 * | 12/2019 | Sibgatulin | G01V 1/288 |
| 10,802,042 | B2 * | 10/2020 | Campsie | G01V 7/00 |
| 2006/0193207 | A1 * | 8/2006 | Zubkow | G01V 1/008 367/178 |
| 2010/0161231 | A1 * | 6/2010 | Atila | G01V 9/002 702/15 |
| 2013/0205887 | A1 * | 8/2013 | Siegel | G01V 7/005 73/152.05 |
| 2014/0165720 | A1 * | 6/2014 | Edwards | G01V 7/00 73/382 R |
| 2015/0260039 | A1 * | 9/2015 | Dyatlov | G01V 7/00 702/6 |
| 2016/0216369 | A1 * | 7/2016 | Kumarakrishnan | H01S 3/1392 |
| 2017/0038286 | A1 * | 2/2017 | Kim | G01V 7/00 |
| 2017/0276697 | A1 * | 9/2017 | Campsie | G01V 7/005 |
| 2021/0132249 | A1 * | 5/2021 | Kukharev | G06F 16/29 |

OTHER PUBLICATIONS

Author—Emerging Technology from the arXiv, Title—Tidal forces carry the mathematical signatures of gravitational waves. MIT Techology Review. Dec. 14, 2019 (Year: 2019).*
Benningfield, Diamond. Predicting Tides. Aug. 5, 2018. Science and the Sea (Year: 2018).*
Kantha et al., Long-period lunar fortnightly and monthly ocean tides. Journal of Geophysical Research. vol. 103, No. C6. pp. 12639-12647. Jun. 1998 (Year: 1998).*

* cited by examiner

METHODS OF SEARCHING FOR MINERAL RESOURCES BY ANALYZING GEOCHEMICAL AND OTHER ANOMALIES DURING GRAVITATIONAL RESONANCES

CROSS-REFERENCE TO RELATED APPLICATIONS

The present patent application U.S. Provisional Patent Application Ser. No. 62/927,984, filed Oct. 30, 2019, said application and its disclosures being incorporated herein by reference in their entireties.

FIELD OF THE INVENTION

This invention relates to the field of prospecting for solid or liquid mineral resources. Solid and liquid mineral resources discoverable by this technology include but are not limited to gold, silver, coal, uranium, peat, lead, slate, metals, potash-magnesium and rock salts, diamonds, chromic iron, cement raw materials, strontium, platinum, and tungsten.

BACKGROUND ART

A system for the remote exploration of mineral deposits is known, for example, from PCT Publication PCT/UA2013/000036, which provides for an improvement in the accuracy of exploration of mineral deposits based on the intensity of the Earth's magnetic field.

U.S. Pat. No. 8,201,448, discloses gravity gradiometers for measuring variations in the gradients of the Earth's gravitational field. Gravity gradiometers may be used in the exploration of minerals and hydrocarbons, since deposits of these substances in the Earth, and variations in the underground structure containing the deposits, produce variations in gravity and thus in the gravitational gradients produced from the variations in gravity.

SUMMARY OF THE INVENTION

The present invention uses is based on measuring a change of the electrochemical potential and/or the geochemical anomalies of solid and/or liquid mineral deposits, as a result of the gravitational resonance caused by the Moon.

All prior art materials for the discovery of solid/liquid mineral deposits use static methods based on a deposit in static form. The present technology, in contrast, is based on dynamic processes. Under the impact of the Moon's gravitational field during a resonance, a geochemical anomaly is formed over a deposit. This is due to the Moon's gravitational field compressing the rock of the deposit. The presented methods comprise predicting the gravitational field resonance and setting up sensing devices which record the dynamics of the deposits and their associate materials during and just before and after such resonances. The recorded information is then analyzed according to the methods described and exemplified herein.

The main advantage of the method of the present invention is its significantly higher accuracy, lower cost, and environmental friendliness (e.g., drilling is not necessary for prospecting).

BRIEF DESCRIPTION OF THE DRAWINGS

The present invention will now be discussed in further detail below with reference to the accompanying figures in which.

DETAILED DESCRIPTION OF PREFERRED EMBODIMENTS

In the following description, for purposes of explanation, specific examples are set forth to provide a thorough understanding of the present invention. However, it will be apparent to one skilled in the art that these specific details are not required in order to practice the present invention. The same techniques can easily be applied to other types similar systems.

Geochemical methods of prospecting for different kinds of mineral deposits (from hydrocarbons and coal to iron, gold, etc.) have been known for a long time now and widely used in the field of geological exploration. However, none of the available geochemical technologies considers the effects of the changing stress-strain state emerging in the geological medium during resonances of 14-day gravitational tides.

Changes of the stress-strain state of a nonhomogeneous geological medium (the medium containing deposits of mineral resources, including solid and liquid mineral resources) inevitably lead to a considerable increase of registered values of geochemical and electrochemical anomalies (e.g., emissions of various gases, a change in the electrochemical potential at the boundary between the ore and the surrounding rock).

The inventive technology for prospecting for various kinds of mineral deposits, including solid-state (i.e., polymetallic) mineral resources is based on dynamic geochemistry and also on electrical chemistry.

In particular, deposits of gold associate with a specific type of sulphide rocks. Following changes of the stress-strain state, geological mediums, during resonances of gravitational tides, manifest themselves because the sulphide-containing rock will manifest itself in geochemical fields by increasing the number of/or the size of anomalies of predetermined and normalized geochemical parameters.

Figure 1:
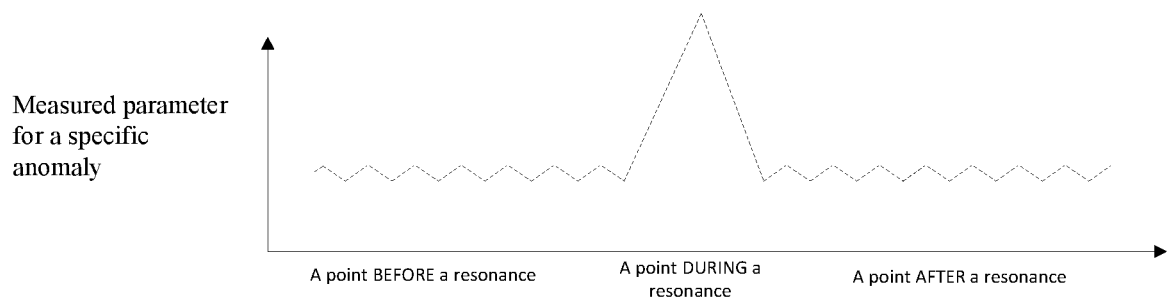
FIG. 1 illustrates what occurs to the presence of minerals and their associates before, during, and after a resonance of a 14-day gravitational tide.
Figure 2:
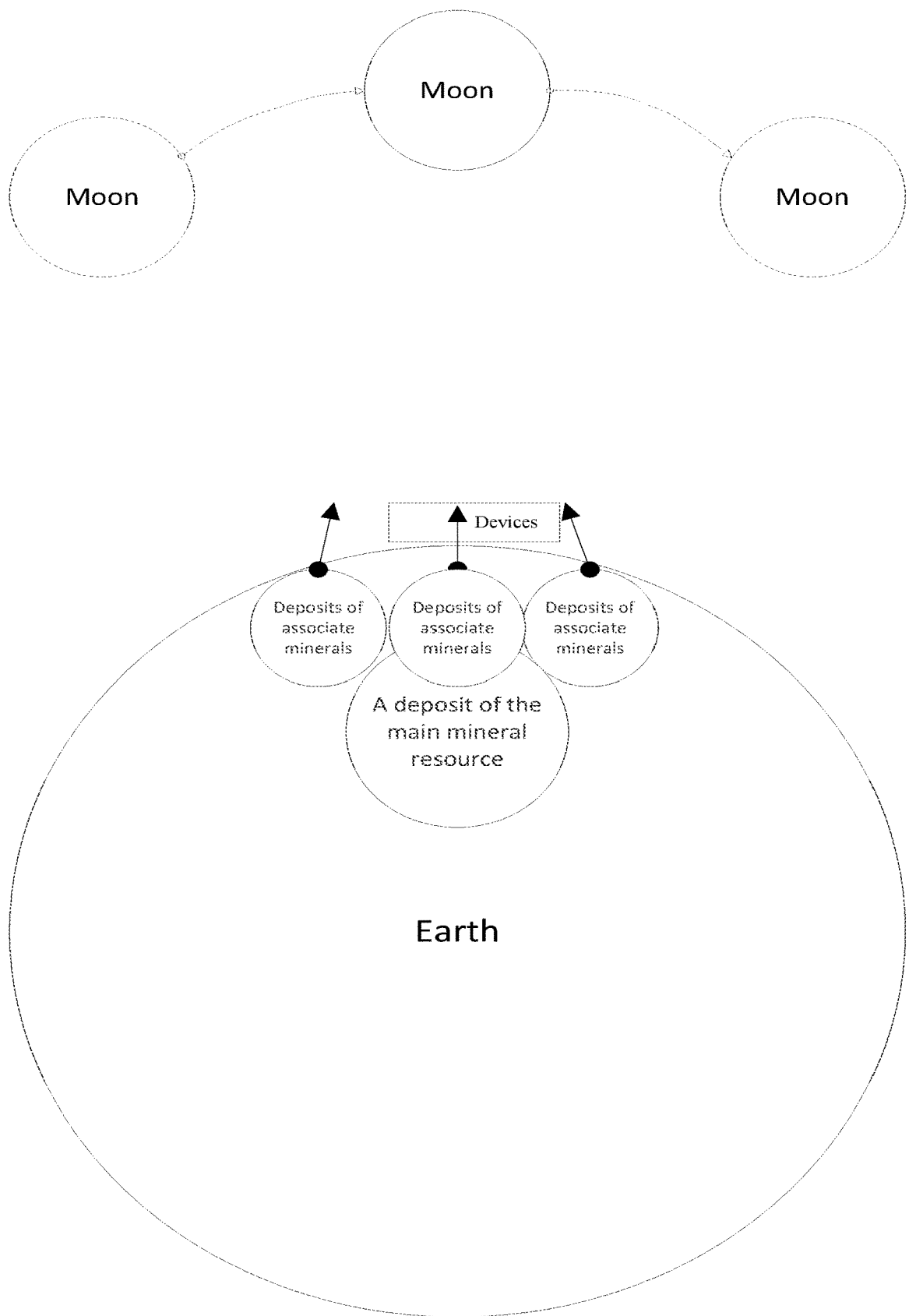
FIG. 2 shows the general concept of the technology of the present invention.

FIG. 1 illustrates what occurs before, during, and after a 14-day gravitational tide resonance. The graph (top of the Figure) illustrates that the presence of base minerals and/or gases in the air (or, alternatively, the value of the electrochemical potential on the boundary between the ore and the surrounding rock) increases during a resonance. In other words, a geochemical anomaly forms during the resonance, and this geochemical anomaly, once detected, may be used to determine the location of deposits of a desired ore. Every mineral resource has associating/secondary minerals, whose presence is also recorded, the data recorded being used in the algorithms disclosed herein. FIG. 2 illustrates the positioning of the Moon, Earth, and minerals within the Earth's crust, as the Moon passes over the portion of the Earth containing the minerals (i.e. before, during, and after a resonance of a 14-day gravitational tide). Gas analyzers and/or chromatographs are positioned along the Earth's surface to record changes in the presence of the minerals, as described hereinbelow.

The present invention comprises registering the geochemical parameters before a resonance of one or more 14-day gravitational tides, during a resonance of said one or more 14-day gravitational tides, and after a resonance of said one or more 14-day gravitational tides. The invention makes it possible to reliably locate geochemical anomalies of gold (or other) nature. Such anomalies do not strongly manifest themselves in a geochemical field in the course of a standard geochemical exploration.

Figure 3:
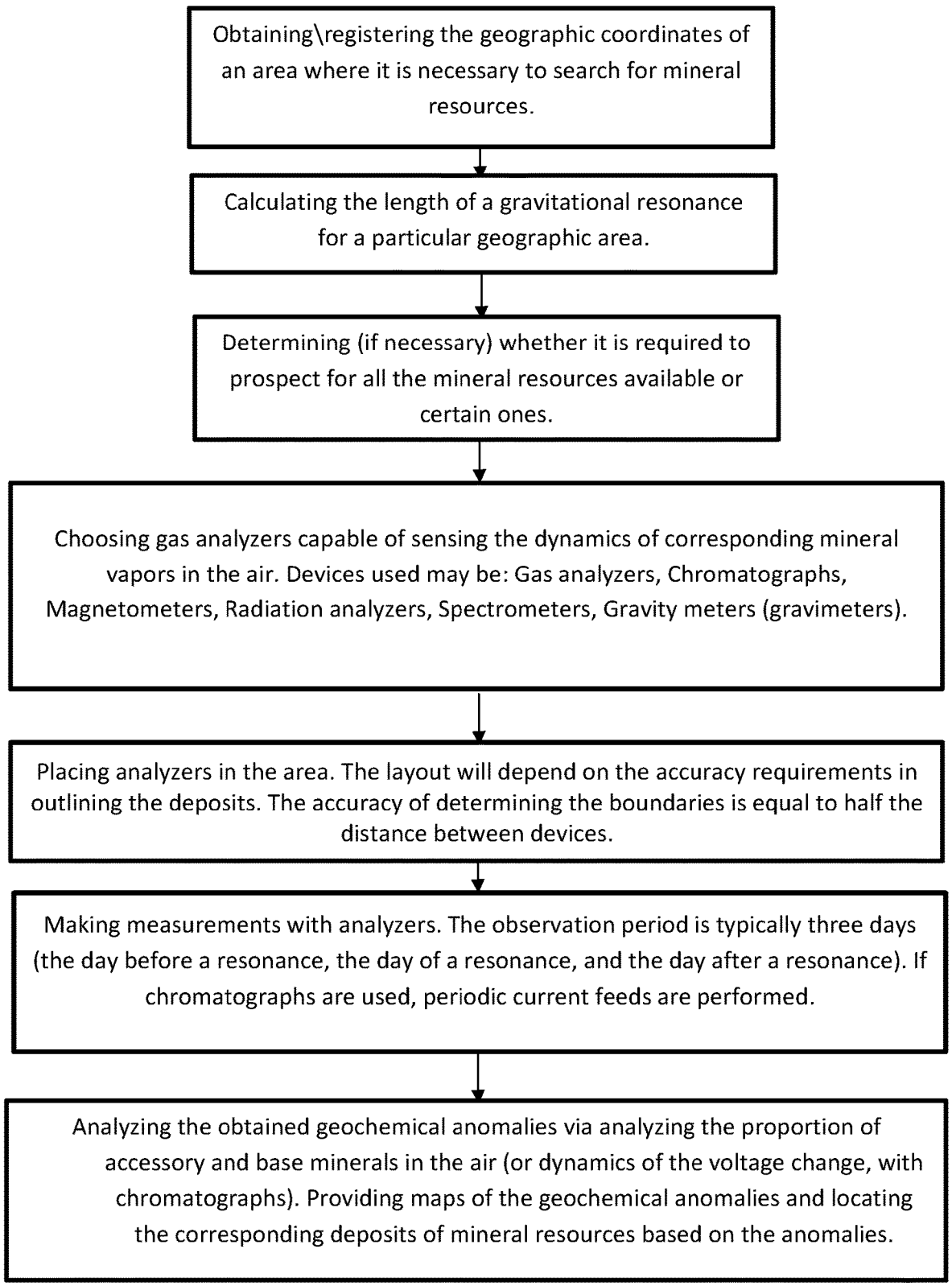
FIG. 3 shows an exemplary general scheme of conducting operations using the technology presented here.

FIG. 3 shows the general process of the present invention. In particular, FIG. 3 outlines the steps of the process to detect the presence of a deposit of interest. The steps are as follows: (1) Obtaining\registering the geographic coordinates of an area where it is desired to search for mineral resources. (2) Calculating the length of a 14-day gravitational tide resonance for a particular geographic area. (3) If necessary, determining whether it is required to prospect for all potential mineral resources available or for certain mineral resources only. (4) Providing a list of gas analyzers capable of sensing the dynamics of the corresponding mineral's vapor in the air. (5) Placing gas analyzers (or chromatographs) in the area, the layout of the detectors/recorders depending on the desired accuracy in outlining the deposits. The accuracy of determining the boundaries is equal to half the distance between devices (i.e. half the pitch). In the simplest situation, the pattern comprises checkrows of the devices, arranged equidistant from one another. (6) Recording measurements with the gas analyzers. The observation period is typically three days (i.e., the day before a resonance, the day of a resonance, and the day after a resonance). The three days is sufficient to record the geochemical anomalies. If chromatographs are used instead of gas analyzers, periodic current feeds are provided. (7) Analyzing the obtained geochemical anomalies by analyzing the proportion of accessory and base minerals in the air (or dynamics of the voltage change, if using chromatographs), thus providing and generating maps of the geochemical anomalies correlated with locations of the deposits of mineral resources and further correlating across locations and/or along the Earth's surface within or between locations.

The present methods and systems are based upon calculating the resonance points for the sphere(s) in the area in which solid or liquid mineral deposits are desired to be searched for.

Twenty-four (24) hours before a resonance, devices are placed in the pre-calculated resonance points (devices include gas analyzers, chromatograph type devices, electric field recorders, depending on the method employed). Measurements are taken one day before a resonance, during a resonance, and one day after a resonance, for each resonance that is calculated to occur.

The shorter that the distance is between the positioned devices, the higher the accuracy of locating the boundaries of deposits along the ground surface (i.e., the accuracy is equal to half of the distance between the devices, and the devices are positioned equidistant from one another).

It is noted that instead of 14-day gravitational resonances, it is also possible to use regular daily resonances, but at a high cost of decreasing accuracy. Such daily resonances are much weaker, so locating a geochemical anomaly would be harder (i.e. would require some meaningful amplification of the results). As gravitational energy levels will be lower, the rock's compression would be less considerable, as would emissions of the elements within a deposit. Therefore, using only daily resonances would result in a significantly lower accuracy.

FIGS. 1 and 2 show the general concept of the present invention. Under the impact of a gravitational field, minerals are deformed and their concentration in the air increases (this is referred to as a geochemical anomaly). Gas analyzers are capable of detecting a change in gas pressure based on the deformation and the concentration change.

Table 1 (see below) comprises the main matches of mineral deposits and their accessories (the list is non-exhaustive). When employing the inventive technology, it is essential to consider the individual features of the deposits adjacent to the area under exploration as well as the dynamics of their geochemical anomalies. During explorations based on this technology, in order to reduce costs, it is possible to single out one dynamic geochemical scent of a deposit (i.e. one noticeable feature). One non-limiting example of such a dynamic geochemical scent would be the benefit of using mercury to facilitate a search for gold sulfur deposits.

TABLE 1

| Base mineral (deposit) | Accessories thereof |
| --- | --- |
| GOLD | quartz, arsenic pyrite, pyrites, copper pyrite, fahl ore, tellurides, galena, sphalerite, mercury, sulfides |
| DIAMOND | In blue earth: forsterite, phlogopite, pyrope, diopside, ilmenite; in placers: ilmenite, garnets, rutile, brookite, octahedrite, hematite, magnetite, tourmaline, gold, zircon, chrysolite. |
| PLATINUM | pyrrhotine, copper pyrite, pentlandite, olivin, pyroxenes, chromespinelides |
| COPPER | azurite, bornite, cuprite, green malachite, silver, chalcosite, chrysocolla |
| SILVER | calci-spar, galena, argentite, acanthite, proustite, pyrargyrite, other sulphosalts of silver, lead, cobalt minerals, nickel |
| GRAPHITE | pyrites, garnet, spinel, vesuvian, diopside, wollastonite |
| SULFUR | anhydrite, aragonite, halite, plaster-stone, calci-spar, celestite, pitch |
| CUPRITE | azurite, antlerite, atacamite, brochantite, argillaceous minerals, calci-spar, green malachite, black iron oxides, barrel-copper, copper sulfides, tenorite, chalcosite, chrysocolla; pseudomorphisms of tetrahedrite and copper pyrite |
| HEMATITE | barites, ilmenite, quartz, magnetite, peach |
| CORUNDUM | andalusite, boehmite, hydrargillite, diaspore, magnetite, nepheline, rutile, sillimante, serpentine, mica, chrysolite, peach, spinel |
| OCTAHEDRITE | brookite, hematite, ilmenite, quartz, magnetite with admixed titanium, rutile, titanium (titanite) |
| SPINEL | andalusite, calci-spar (marble, lime-stone), corundum, a series of hornblende, sillimante, scapolite, phlogopite, forsterite, chondrodite |

TABLE 1-continued

| Base mineral (deposit) | Accessories thereof |
| --- | --- |
| ILMENITE | apatite, hematite, magnetite, pyrrhotine, rutile, ulvospinel. |
| FERBERITE | scheelite, chrysolite, fluor spar, marcasite, pyrites, hematite, feldspar |
| HUBNERITE | cassiterite, arsenic pyrite, molybdenite, minerals of the tourmaline group, chrysolite, rhodochrosite, fluor spar |
| WOLFRAMITE | quartz, potash mica, beryl (in greisens), bismuthite, tungstite, hydrokenoelsmoreite, copper pyrite, antimony bloom. |
| PYROCHLORE | betafite, nepheline, potash feldspar, aegirite, sphene, ilmenite, apatite, phlogopite, zircon (magmatic origin); phlogopite, betafiteankerite, siderite, magnetite, perofskite; nepheline, potash feldspar, aegirite, sphene, zircon |
| OIL&GAS | methane, propane, ethane and their derivatives |
| PEROFSKITE | magnetite, garnet, peach, titanite, chromite, olivin, melilite, diopside, leucite, sphene |
| BRUCITE | aragonite, artinite, hydromagnesite, dolomite, calci-spar, magnesite, periclase, talcum, peach, chrysotile |
| BROWN HEMATITE | hematite, chalcedony, argillaceous minerals, aluminum hydroxide (exogenous origin); hematite, barites, chalcedony |
| GOETHITE | hematite, lepidocrocite, brown manganese ore, pyrites, pyrolusite, siderite and many other minerals containing iron and manganese. |
| DIASPORE | corundum, magnetite, margarite, chloritoid, spinel, peach, hydrargillite, boehmite, sillimante, lepidocrocite, hematite |
| BOEHMITE | kaolinite, hydrargillite, diaspore (bauxites); nepheline, hydrargillite, diaspore, natrolite, analcite (nepheline pegmatite). |
| HYDRARGILLITE | diaspore, boehmite, corundum, kaolinite, goethite. |
| PYROLUSITE | braunite, hausmannite, hematite, goethite, hollandite, dolomite, brown manganese ore, calci-spar, rhodonite, rhodochrosite, siderite, chalcophanite; brown hematite - mineral aggregate, which is a mixture of hydrooxides of ferric iron: goethite, hydrogoethite, hydrohematite, lepidocrocite (the former dominant). |
| BRAUNITE | pyrolusite jacobsite, hausmannite, bixbyite, rhodonite, spessartite, hematite |
| PYRRHOTINE | galena, cubanite, magnetite, marcasite, pentlandite, pyrites, sphalerite, copper pyrite |
| PENTLANDITE | pyrrhotine, copper pyrite, magnetite. |
| MOLYBDENITE | quartz, dolomite, mica, feldspar; wolframite, cassiterite, copper pyrite and other minerals of tungsten, tin, copper; pyrites, chrysolite, fluor spar |
| GALENA | sphalerite, copper pyrite, arsenic pyrite, anglesite, barites, dolomite, calci-spar, quartz, marcasite, pyrites, fluor spar, cerussite. |
| SPHALERITE | pyrites, copper pyrite, galena, pyrrhotine, magnetite, arsenic pyrite, stanine, fluor spar, barites, calci-spar, quartz; wurtzite |
| COPPER PYRITE | galena, sphalerite, pyrites, pyrrhotine, pentlandite |
| CHALCOSITE | bornite, covellite, molybdenite, pyrites, copper pyrite |
| CINNABAR | antimony bloom, pyrites, marcasite, arsenic pyrite, realgar, sphalerite, copper pyrite, mercury, gold, quartz, calcium |
| STIBNITE | ankerite, arsenic pyrite, orpiment, barites, berthierite, galena, gudmundite, gold, quartz, calci-spar, kaolinite, cinnabar, marcasite, pyrites, realgar, cervantite, sphalerite, antimony, fluor spar |
| BISMUTHITE | native bismuth, aikinite, arsenic pyrite, stannite, galena, pyrites, copper pyrite, tourmaline, wolframite, cassiterite, quartz |
| ORPIMENT | antimony bloom, barites, plaster-stone, quartz, calci-spar, marcasite, pyrites, realgar, stibnite, native arsenic |
| REALGAR | antimony bloom, orpiment, cinnabar, marcasite, quartz, calci-spar, native arsenic, pyrites. |
| PYRITES | arsenic pyrite, barites, galena, hematite, greigite, calci-spar, quartz, marcasite, pyrrhotine, pentlandite, siderite, sphalerite, fluor spar, copper pyrite, nasturan |
| ARSENIC PYRITE | quartz, sphalerite, copper pyrite, bournonite, pyrites, pyrrhotine, galena, bismuthite |
| TENNANTITE | sulfides, sulphosalts, pyrites, calci-spar, dolomite, siderite, barites, fluor spar, quartz |
| TETRAHEDRITE | copper pyrite, galena, sphalerite, pyrites, bornite, acanthite, calci-spar, dolomite, siderite, barites, fluor spar, quartz |
| FORSTERITE | augite, amphiboles, antigorite, brucite, diopside, dolomite, calci-spar, corundum, magnetite, plagioclases, phlogopite, chromite, spinel, enstatite |
| FAYALITE | augite, plagioclases, potash feldspar, quartz, apatite, magnetite, ilmenite, spinel, hedenbergite, arfvedsonite, amphiboles, almandine, tridymite, grunerite |
| ANDALUSITE | almandine, biotite, cyanite, cordierite, corundum, potash mica, sillimante, staurolite, tourmaline |
| SILLIMANTE | andalusite, cyanite, K-feldspar, almandine, cordierite, biotite, quartz. |
| CYANITE | andalusite, almandine, corundum, rutile, sillimante, staurolite, zoisite |
| STAUROLITE | almandine, andalusite, quartz, cyanite, potash mica, sillimante, tourmaline |

TABLE 1-continued

| Base mineral (deposit) | Accessories thereof |
|---|---|
| CHRYSOLITE | albite, bull quartz (rauchtopaz), cassiterite, lepidolite, orthoclase, spessartite, tourmaline, fluor spar, zinnwaldite |
| ZIRCON | allanites, amphiboles, ilmenite, quartz, magnetite, pyrochlore supergroup minerals, mica, aegirite (aegirine), xenotime-(Y); |
| TITANITE | albite, minerals of the peach group, epidote, apatite, orthite-(Ce), orthite-(Y), monazite - (Ce), magnetite, ilmenite, nepheline, biotite, diopside, calci-spar |
| PYROPE | wolframite, molybdenite, hematite, quartz, garnets, pyroxenes |
| ALMANDINE | amphiboles, andalusite, biotite, hematite, calci-spar, quartz, cyanite, cordierite, magnetite, potash mica, plagioclases, pyrites, pyroxenes, sillimante, staurolite, peaches, epidote |
| SPESSARTITE | biotite, graphite, quartz, magnetite, potash mica, rutile, sillimante, cyanite, actinolite |
| GROSSULARITE | vesuvian, wollastonite, diopside, scapolite, peach, epidote |
| ANDRADITE | vesuvianite, dolomite, calci-spar, magnetite, peaches, spinel, epidote |
| UVAROVITE | diopside, dolomite, calci-spar, quartz, olivines, pyroxene, plagioclases, tremolite, chrome clinochlore, chromite, zoisite, epidote |
| EPIDOTE | actinolite, amphiboles, calci-spar, quartz, plagioclases, zeolites - common for greenschist facies; amphiboles, vesuvianite, wollastonite-1A, garnets, pyroxenes, scapolite, talcum - common for epidote-hornfels facies; glaucophane, garnets, lawsonite, omphacite, pumpellyite, riebeckite - common for blueschist facies. |
| CLINOZOISITE | amphiboles, plagioclases, quartz |
| ZOISITE | albite, amphiboles, biotite, garnet, calci-spar, quartz, sulfides. |
| ALLANITE | epidote, fluor spar, potash mica. |
| BERYL | arsenic pyrite, albite, wolframite, cassiterite, quartz, lepidolite, potash mica, feldspar, rutile, spodumene, chrysolite, tourmaline, phenacite, phlogopite, fluor spar, chrysoberyl. |
| EMERALD | alexandrite, phenacite, chrysoberyl, quartz, biotite, phlogopite, felspar |
| AQUAMARINE | quartz, potash feldspar, albite, tourmaline; chrysolite, cassiterite, hematite, molybdenite, arsenic pyrite |
| VOROBYEVITE | cleavelandite, lepidolite, elbaite |
| CORDIERITE | sillimante, potassic feldspar, potash mica, biotite, corundum, spinel, garnet, andalusite |
| SCHORL | albite, wolframite, cassiterite, quartz, potash mica, chrysolite |
| DRAVITE | axinite, beryl, wolframite, datolite, bull quartz, cassiterite, chrysolite |
| ELBAITE | beryl, wolframite, bull quartz, cassiterite, chrysolite |
| ACHROITE | beryl, verdelite, wolframite, bull quartz, indicolite, cassiterite, rubellite, chrysolite. |
| VERDELITE | beryl, bull quartz, wolframite, cassiterite, chrysolite |
| INDICOLITE | achroite, beryl, verdelite, wolframite, bull quartz, cassiterite, rubellite, chrysolite |
| RUBELLITE | albite, achroite, verdelite, indicolite, quartz, lepidolite, potash feldspar |
| ENSTATITE | olivines, phlogopite, minerals of the group clinopyroxene, diopside, spinel, pyrope |
| DIOPSIDE | apatite, biotite, essonite, grossularite, graphite, idocrase, magnetite, plagioclases, scapolite, titanite, tremolite, phlogopite, peaches, spinel, epidote |
| HEDENBERGITE | grunerite (Iron Formation); arfvedsonite, quartz, fayalite (granites, syenite). |
| AUGITE | orthoclase, sanidine, labradorite, olivines, leucite, amphiboles, pyroxenes |
| AEGIRITE | apophyllite, arfvedsonite, astrophyllite, minerals of the K-feldspar group, catapleite, nepheline, riebeckite, serandite, titanite, eudialyte, aenigmatite. |
| JADEITE | garnets, quartz, lawsonite, serpentine, stilpnomelane, mica, titanite, feldspathoid, peach, zoisite. |
| OMPHACITE | garnetquartz, cyanite, corundum (eclogites); scapolite, epidote, glaucophane (blueschist). |
| SPODUMENE | quartz, albite, tourmaline, potash feldspar, tantalite, pollucite, petalite, eucryptite, lepidolite, beryl. |
| RHODONITE | braunite, hausmannite, calci-spar, brown manganese ore, pyroxenes, spessartite, franklinite, zincite. |
| WOLLASTONITE-1T | calci-spar, grossularite, diopside, vesuvian, ocermanite, merwinite, larnite, spurrite. |
| TREMOLITE | calci-spar, dolomite, grossularite, wollastonite-1T, talcum, diopside, forsterite, cummingtonite, Winchite, riebeckite. |
| AMESITE | vesuvian, minerals of the peach group (Antarctic, Pensacola Mountains); magnetite, rutile, diaspore, grossularite, calci-spar, diopside, clinozoisite. |

TABLE 1-continued

| Base mineral (deposit) | Accessories thereof |
|---|---|
| CHRYSOTILE | magnetite, antigorite, serpophite, carbonate rock, talcum, tremolite, peach. |
| KAOLINITE | quartz, felspar, potash mica. |
| TALCUM | actinolite, anthophyllite, vermiculite, dolomite, calci-spar, magnesite, pyroxenes, minerals of the serpentine group, tremolite, peaches; magnetite, pyrites. |
| PYROPHYLLITE | cyanite, andalusite, chrysolite, mica, quartz. |
| MONTMORILLONITE | beidellite, nontronite, saponite, hectorite, sauconite, hydromica, mixed-layer minerals, kaolinite, sepiolite, palygorskite, zeolites, carbonate rocks, soluble salts, pyrites, magnesian silicate, glauconite, oxides and hydrooxides Fe, earth silicon modifications and humic compounds. |
| SAPONITE | beidellite, dolomite, calci-spar, quartz, montmorillonite, orthoclase, celadonite, peaches, epidote. |
| BIOTITE | quartz, potash mica, feldspar, nepheline, pyroxenes, amphiboles, andalusite, cordierite, garnets, spinel. |
| PHLOGOPITE | augite, vesuvianite, diopside, dolomite, calci-spar, magnetite, apatite supergroup minerals, olivenite, minerals of the scapolite group, titanite, tremolite, epidote. |
| POTASH MICA | albite, minerals of the biotite supergroup, garnet (almandine), quartz, K-feldspar, orthoclase, oligoclase, staurolite, tourmaline, chloritoid. |
| LEPIDOLITE | spodumene, beryl, quartz, potash mica, minerals of the biotite supergroup, minerals of the tourmaline supergroup, chrysolite, amblygonite, minerals of the columbite series, cassiterite. |
| BAILYCHLORE | garnet, vesuvian, chamoisite, goethite, hematite, chalcosite, barrel-copper, green malachite, calci-spar. |
| BOROCOOKEIT | elbaite, lepidolite, danburite, boric potash mica, laumontite, quartz, albite. |
| CLINOCHLORE | vesuvian, garnet, diopside, calci-spar, magnetite, titanite, chondrodite, epidote, quartz, dolomite, actinolite, biotite, olivines, plagioclases, talcum. |
| COOKEIT | lepidolite, spodumene, tourmaline, petalite, quartz, albite, potash feldspar. |
| PENNANTITE | analcite, paragonite, pyrophanite, garnet, barites, ganophyllite, cutnogorite, willemite, prehnite, datolite, roeblingite, clinohedrite, chanchocite. |
| CHAMOISITE | kaolinite, brown hematite, magnetite, siderite, calci-spar, galena, pyrites, marcasite, goethite. |
| NEPHELINE | albite, apatite, potash feldspar, hornblende, titanite, aegirite. |
| LEUCITE | potassic feldspar, nepheline, analcite, natrolite, kalsilite. |
| ALBITE | orthoclase, potash mica, biotite, hornblende. |
| OLIGOCLASE | sanidine, tourmaline, corundum. |
| LABRADORITE | magnetite, olivin, pyroxenes, pentlandite, pyrrhotine, chromite, copper pyrite. |
| ANORTHITE | forsterite, fayalite, pyroxene, corundum. |
| POTASH FELDSPAR | albite, quartz, biotite, and others. |
| ORTHOCLASE | quartz, mica, plagioclases, titanite, zircon, garnets, spinel, schorl, beryl. |
| SANIDINE | quartz, albite, potash mica, biotite, hornblende, magnetite. |
| SCAPOLITES | plagioclase, garnet, pyroxene, amphibole, apatite, titanite, zircon. |
| WISCHNEWITE | aegirite, nepheline, cancrinite, sodalite, scolecite. |
| CANCRINITE | nepheline, sodalite, natrolite, orthoclase, monticellite, andradite, zircon. |
| SODALITE | albite, titanian andradite, ankerite, barites, calci-spar, cancrinite, potash feldspar, nepheline, sanidine, titanite, fluor spar, zircon, aegirine. |
| HAUYNITE | nepheline, leucite, andradite, melilite, augite, sanidine, biotite, phlogopite, apatite. |
| LAZURITE | calci-spar, pyrites, diopside, humite, forsterite, hauynite. |
| ANALCITE | quartz, feldspar, biotite, nepheline, aegirite, behoite, serandite, natrolite and other zeolites, prehnite, glauconite, calci-spar, galena, magnetite. |
| NATROLITE | zeolites, calci-spar, nepheline, sodalite, quartz. |
| THOMSONITE-Ca | datolite (datolite), calci-spar, quartz, prehnite, zeolites. |
| CHABASITE-Ca | zeolites, nepheline, melilites, olivines, pyroxenes, amphiboles, epidote, calci-spar, tridymite, dolomite. |
| PLASTER-STONE | anhydrite, aragonite, halite, dolomite, calci-spar, pyrites, sulfur. |
| ANHYDRITE | plaster-stone, halite, polyhalite, dolomite, calci-spar, magnesite, celestite, sulfur. |
| BARITES | antimony bloom, galena, hematite, calci-spar, quartz, marcasite, pyrites, siderite, sphalerite, fluor spar, copper pyrite, and other minerals. |

TABLE 1-continued

| Base mineral (deposit) | Accessories thereof |
|---|---|
| CELESTITE | aragonite, calci-spar, dolomite, plaster-stone, halite, sulfur and other. |
| ANGLESITE | cerrusite, leadhillite, lanarkite, caledonite, linarite, brochantite, green malachite, mimetite, pyromorphite, wulfenite, massicot, plaster-stone, sulfur, galena. |
| ALUM STONE | kaolinite, diaspore, pyrites, plaster-stone, quartz. |
| JAROSITE | alum stone, pyrites. |
| MAGNESITE | antigorite, dolomite, calci-spar, talcum. |
| SIDERITE | ankerite, galena, hematite, plaster-stone, dolomite, calci-spar, magnetite, pyrites, tetrahedrite, copper pyrite, peach. |
| RHODOCHROSITE | hematite, brown hematite, marcasite, pyrites, pyrrhotine, sphalerite. |
| SMITHSONITE | hydrogoethite, hemimorphite, willemite, hydrozincite, cerussite, green malachite, azurite, aurichalcite, anglesite. |
| CALCI-SPAR | sulfides Cu, Pb, Zn, Co, Ni, Ag, Bi, sulphosalts; zeolites, peaches, sercite, dolomite, fluor spar, and other. |
| ARAGONITE | opal, chalcedony, other carbonate rocks (hydrothermal genesis). Plaster-stone, dolomite, argillaceous minerals (hypergene genesis). |
| STRONTIANITE | calci-spar, barites, sphalerite, galena, celestite, sulfur. |
| WITHERITE | barites, calci-spar, galena, sphalerite, isomorphic to aragonite. |
| CERUSSITE | azurite, anglesite, vanadinite, galena, green malachite, pyromorphite, smithsonite, cromfordite; brown hematite. |
| DOLOMITE | barites, quartz, calci-spar, siderite, metal sulfides, fluor spar |
| ANKERITE | barites, dolomite, siderite, fluor spar. |
| GREEN MALACHITE | azurite, bornite, hematite, calci-spar, cuprite, barrel-copper, tetrahedrite, chalcosite, copper pyrite, chrysocolla, cerussite; brown hematite |
| AZURITE | green malachite, chrysocolla, cuprite, barrel-copper, brochantite, ehlite, plaster-stone; brown hematite |
| APATITE | glauconite, calci-spar, nepheline, feldspar, aegirite |
| BLUE OCHRE | ludlamite, maricite, metablue ochre, pyrites, pyrrhotine, santaclaraite; brown hematite |
| SCHEELITE | wolframite, molybdenite, hematite, quartz, garnets, pyroxenes |
| HALITE | anhydrite, plaster-stone, argillaceous minerals, dolomite, calci-spar, carnallite, kieserite, polihalite, native sulfur, sylvite |
| URANIUM | molybdenite MoS2, galena PbS, quartz SiO2, calci-spar CaCO3, hydropotash mica and other |
| FLUOR SPAR | barites, fahl ore (complex copper sulfides forming an series isomorphic to tennantite-tetrahedrite), galena, plaster-stone, dolomite, calci-spar, cassiterite, quartz, creedite, marcasite, minerals of the apatite supergroup, minerals of silver, minerals of the tourmaline group, minerals of the wolframite series, molybdenite, opal, pyrites, siderite, sphalerite, chrysolite, copper pyrite, celestite, scheelite |
| RHUTENIUM | ultrabasic magmatics |
| RHODIUM | ultrabasic magmatics |
| PALLADIUM | sulfides (pyrrhotine, copper pyrite, pentlandite) |
| OSMIUM | ultrabasic magmatics, platinum, palladium, sulfides, sulphur, arsenic |
| IRIDIUM | chromespinelide, osmium, rhodium, rhenium, rhutenium, osmiridium, syssertskite and aurosmirid. |
| COAL | Methane |

The present method and systems dramatically reduce the amount of drilling required when prospecting for any mineral resources. The geochemical anomalies identified may be verified afterwards with drilling. The method and systems of the present invention allow for a tuning into to any specific type of deposit.

It is preferable to provide geochemical anomaly casts of known deposits, in order to enter the corresponding data into a database. The Moon's gravitational pressure changes chemical reactions within the deposits and along the boundary between deposit and surrounding rock. The gravitational pressure changes are registered by the present method and systems. Analysis of the registered data, and comparison between the recorded anomaly and previously recorded anomaly casts, leads to a determination of the type of deposit.

According to measurements based on the technology, for example, the concentration of mercury vapors in the air for a typical sulfide commercially viable gold deposit is, on average, 300-600 ng per cubic meter. Such a concentration of mercury vapors is detected in the air with various gas analyzers before, during and after a resonance day as determined according to the present invention. On non-resonance days, the concentration of associate minerals is significantly lower. In contrast, on resonance days, the concentration of mercury vapors and its dynamics can be sufficiently higher (based on the richness of the deposits—the larger the deposit, the greater the concentration and its dynamics).

If the concentration of mercury vapors in the air are smaller than desired, it is the owners of the deposit who should decide on the commercial viability of production at that location.

In another example, the dynamics of the concentration of methane (propane) vapors in the air for a typical commercially viable oil and/or gas deposit is, on average, 500 ng per cubic meter or higher.

It should be noted that an anomaly on the day of a gravitational resonance is a combination of the following:

(1) The dynamics of concentration of flower and plant humus (for kimberlite pipes and diamonds).

(2) The dynamics of indicators using spectrometric (metallometric) and microchemical methods for soils and residual-talus deposits, stream sediments, peat, and other formations.

(3) Dynamics of radioactive emission indicators are important when searching for radioactive minerals of the uranium type. The dynamics of artificial radioactivity are also relevant when searching for deposits of heavy metals such as lead, zinc, molybdenum, mercury, antimony, as well as when searching for radioactive ores, phosphoritic, tantalum, columbium, rare earth deposits, and any ores containing admixtures of radioactive metals.

Dynamics of electrometric indicators are useful when measuring for resistance based on the study of artificially generated DC fields (e.g., different types of electric profiling, electric probing and charging). They are also useful for detecting fields of the physical and chemical origin (e.g., a natural field caused by polarization, partial extraction of metals, and the contact method of polarization curves). They may also be useful for detecting a low-frequency electromagnetic field (e.g., inductive methods of dipole inductive profiling, long cable, transitional processes; electromagnetic probing) and radio-wave methods (e.g., radio-comparison and position finding, radio-wave inspection). Economically, the lowest cost approach is to generate electric current in the points where prospecting is under way, and measure its changes on the resonance days (in dynamics).

Dynamics of gas concentrations in the air signal the presence of mineral resources, which can be further identified by associate gases in the air (e.g., mercury sulfide for gold deposits, methane and propane for oil and gas deposits). Measuring may be performed with gas analyzers.

Dynamics of magnetic field indicators are useful when searching for iron ores. These dynamics are indicative of the presence of magnetite and titan-magnetite deposits, which comprise ores having high magnetic susceptibility. Dynamics registration allows identifying and outlining anomalous magnetic fields associated with ore deposits, as well as elaborating and assessing anomalous areas, zones, and local anomalies. Measurements may be taken with magnetometers.

Dynamics of the gravitational field indicators are useful, for example, if there is a gas deposit and the gas is light. This implies that there may be an anomalous gravitational field in this area. The gravitational field's dynamics can be monitored during a gravitational resonance. The targets of exploration using gravimeters in real time may also comprise deposits of iron, chromite, copper-nickel, and other ores which are significantly different in density from the container rock (i.e. surrounding rock). In a gravitational field, barium sulfate bedrocks, barytic, and barium-lead-zinc features are also indicated by positive gravity anomalies. Rare metal, copper-porphyry, and gold-quartz ore areas are fixed with minimums of a complex shape gravitational field, while the presence of large features in ore districts is identified with high-density rock panels that distort these minimums. Measuring is performed with gravimeters.

During exploration activities, an occurrence of such an anomaly is a sign of a deposit's presence. The type of anomaly that one is looking for is determined by the initial conditions (place, time, type of deposit), which, in their turn, are determined by the customer of a particular order. It is possible to search for several anomalies at the same time (so long as there are devices available), but it is less costly to concentrate looking for a specific type of a mineral resource and choose a specific type of anomaly. Accordingly, it is preferred to choose a particular type of equipment for anomaly analysis rather than several different devices. For example, the least costly and most efficient method is, e.g., to use mercury gas analyzers to search for gold sulfide deposits, methane\propane gas analyzers to search for oil and gas, and radiation analyzers to search for uranium (possibly together with analyzers of silicon oxide).

Devices used to prospect for mineral resources can be (depending on the type of anomaly/deposit): (1) Gas analyzers, (2) Chromatographs, (3) Magnetometers, (4) Radiation analyzers, (5) Spectrometers, (6) Gravity meters (i.e. gravimeters).

Each different type of deposit has its own geochemical dynamics anomaly during a given resonance. By relying on and comparing with the database of geochemical anomaly casts, each set of casts corresponding to a different type of deposit, the present invention is capable of detecting each individual geochemical dynamic anomaly. The database continues to be updated as the systems continue searching for mineral deposits.

There are also associating minerals (i.e. accessories, accessory minerals, associate minerals) for different types of mineral resources (see Table 1).

The present invention comprises employing different types of gas analyzers and chromatographs (depending on the desired detection). Gas analyzers are less expensive. Gas analyzers detect the dynamics of changes in the air (e.g., during a resonance). The changes in the air detected comprise changes in the minerals as well as the actual mineral resource. During a resonance of gravitational tides, chemical reactions induce changes in the air's composition. Electrical conductivity changes can also be registered. Therefore, it is also possible to induce a strong current and record changes of electrical conductivity during a resonance.

Employing the inventive technology for a particular application: searching for gold based on dynamic resonant gas-mercury geochemistry. The present invention was reliably (with reliability of over 80%) employed to locate gold ore sites having an enhanced concentration of mercury (from sulfide deposits).

The method of gas-mercury monitoring via gas analyzers comprises, registering for three days: results before a resonance, results during a resonance, and results after a resonance). During 14-day gravitational tide resonances, the mercury emission rises even further, thus further increasing the probability of accurately delineating a gold ore deposit. If a gold ore occurrence is accompanied by other chemical accessory compounds, it is further necessary to run a preliminary trial of the proposed technology at known benchmark sites.

The registering equipment used was the «RA-915M» mercury gas analyzer. It is also possible to use any other equivalent gas analyzers that can measure the range of mass concentration of mercury vapors in the air, from 0 to 20000 ng/m$^3$.

The analysis of the present invention comprises the following:

The following 3 formulas are used to generate geochemical anomaly maps:

$$D_g D_{gen} + D_{an} \quad \text{(Equation 1)};$$

where $D_r$ is geochemical dispersion,
$D_{gen}$ is general dispersion,
$D_{an}$ is analytical dispersion, $$D_{gen} = \frac{1}{(n-1)} \sum_{i=1}^{n} \left[ \left( \frac{C_{i1} + C_{i2}}{2} \right) - C_{cp} \right]^2; \text{ and} \quad \text{(Equation 2)}$$

$$D_{an} = \frac{1}{2(n-1)} \sum_{i=1}^{n} [C_{i1} - C_{i2}]^2. \quad \text{(Equation 3)}$$

When drawing maps, the mercury diffusion from a source in the atmospheric air is taken into account.

Spreading of mercury vapor concentration is represented by the following relationship:

$$C = b \frac{e^{-aI X}}{X}. \quad \text{(Equation 4)}$$

Value per running length of a geochemical dispersion halo in the atmosphere is represented by the following relationship:

$$M_X = b \int_{X_1}^{X_2} \frac{e^{-aI X}}{X} dX. \quad \text{(Equation 5)}$$

It is necessary to use mercury analyzers of the RA-915M type (or any similar devices or equivalents).

Covering an area of 4 square miles, with a pitch of 20 meters (i.e., 10,000 points of detection), with the help of 5 groups (1 device and 2 people per each group), takes about four (4) days. Alternatively, the work may be performed by a single person, or two people, using a total of 5 devices and taking a plurality of readings (e.g., 10,000 readings at various positions over less time). Each part of monitoring activities must be repeated twice (i.e. completing the field work takes a total of 12-15 days). One device is set up in a stationary manner and is used as the reference point (in order to bring all the data from all the devices into a single scale, taking into consideration specific traits of the resonance energy). Calculating costs comprises setting up a network on the 4 square mile area. The area must knowingly contain an ore body, and then the system must ascertain the contours of that ore body.

If the area for prospecting for gold ore bodies has not been studied well enough, an appraisal survey is initially performed in a sparse network comprising portions of 100×100 meters. This allows for exploring around 20 square meters per one month, based on this example. The costs of this initial appraisal survey will be similar compared to costs for the detailed exploration stage.

Thus, assessment of an area of about 20 square miles, with goals of finding a gold ore body and further extrapolation of data on the area, based on this example, takes about two (2) months and incurs no drilling costs.

The degree of a mineral resource's solidity may vary. The same is true about the solidity of accessory minerals relating to that resource and other elements. The oxidizing properties and concentrations of such minerals in the air may also vary. Every specific case of a practical application of the inventive technology requires determining which of the accessory elements (or which of the desired mineral resources) is less costly and easier to detect in the air. In some cases, it is one element; in other cases, it is a combination of two or more elements. The idea of solidity for mineral resources is quite conventional, as this technology allows looking for oil based on the dynamics of methane and propane vapors.

As for electrochemical methods (when a powerful current surge is initiated and the current attenuation in the Earth's crust is registered), the above described methods and systems are similar, while the feedback dynamics determine the location of deposits.

The data obtained is analyzed. During a resonance over a deposit, emission of chemical elements related to the specific deposit becomes more intense. A geochemical anomaly is formed over the deposit.

Considering this data alongside analyzing the device location layout, the system produces a deposit map.

Every solid or liquid mineral resource has accompanying/ associating minerals. For diamonds, there is pyrope, for coal, there is methane, for gold there are sulfur compounds of basic metals and allied minerals—yellow copper, sulfur ore, sphalerite, lead sulfide, brown ore, etc., and so on. Registration of corresponding geochemical anomalies during the resonance by gas analyzers or chromatographs is indicative of the deposit's presence.

The inventive technology is based on the registering of changes in the amplitude of element emission, the element being located inside the Earth's crust. Changes in the electrochemical potential may also be registered.

FIGS. 5-8 illustrate examples involving calculations of gravitational resonances in various locations. The figures are supplemented with a calculation variant for the dates associated with the resonance. If necessary, a calculation may be performed without accounting for the barycentre position (i.e., making the process simpler), as long as there is a powerful gravitational resonance at the required time and in the particular part of the exploration area. FIGS. 5-8 illustrate 4 examples where several graphs are compared together in order to predict resonance dates. More particularly, FIGS. 5-8 show the following:

Curve 1—the distance between the Earth-Moon barycentre and the observer (hereafter, L);

Curve 2—distance between the Earth and the Moon (hereafter, R);

Curve 3—the lunar phase—the moon's visible part (hereafter, F);

Curve 4—the barycentre depth (hereafter H). The barycentre depth, or depth of the barycenter, as used herein, is defined as the distance from the center of mass of the Earth-Moon system to the surface of the Earth.

The R, F, and H curves are always the same. The L curve is calculated for every individual area based on the coordinates of that area.

The main graph shows:

Potential resonance moments—the intersection points of all the graphed curves (L-R, L-F, L-H, R-F, R-H, F-H);

Secondary data—the maximums and minimums of all the graphed curves (L, R, F, H).

Example 1. One Embodiment Implementing the Algorithm Calculations for Forecasting a Resonance Day Inputs comprise: (1) an excel file with data, (1) the observer's coordinates, and (3) graph dates.

Figure 4:
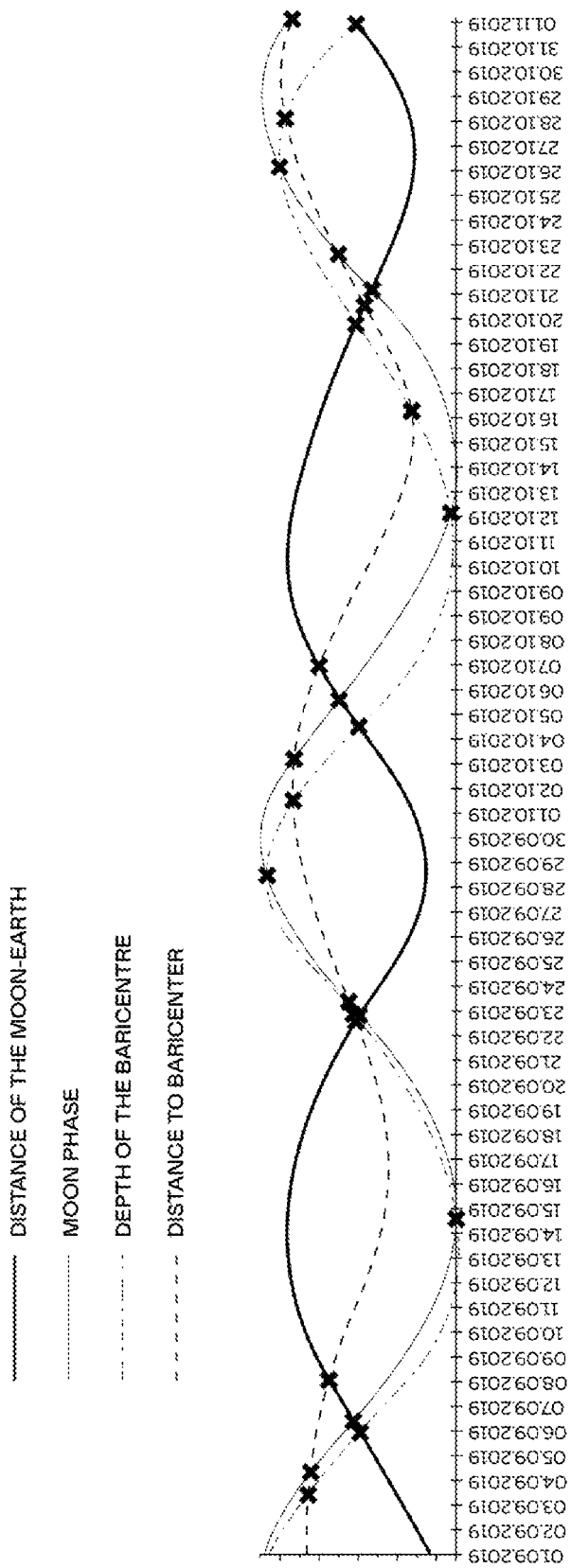
FIG. 4 illustrates a case study for determining a day of resonance from the North Sea, England.
Figure 5:
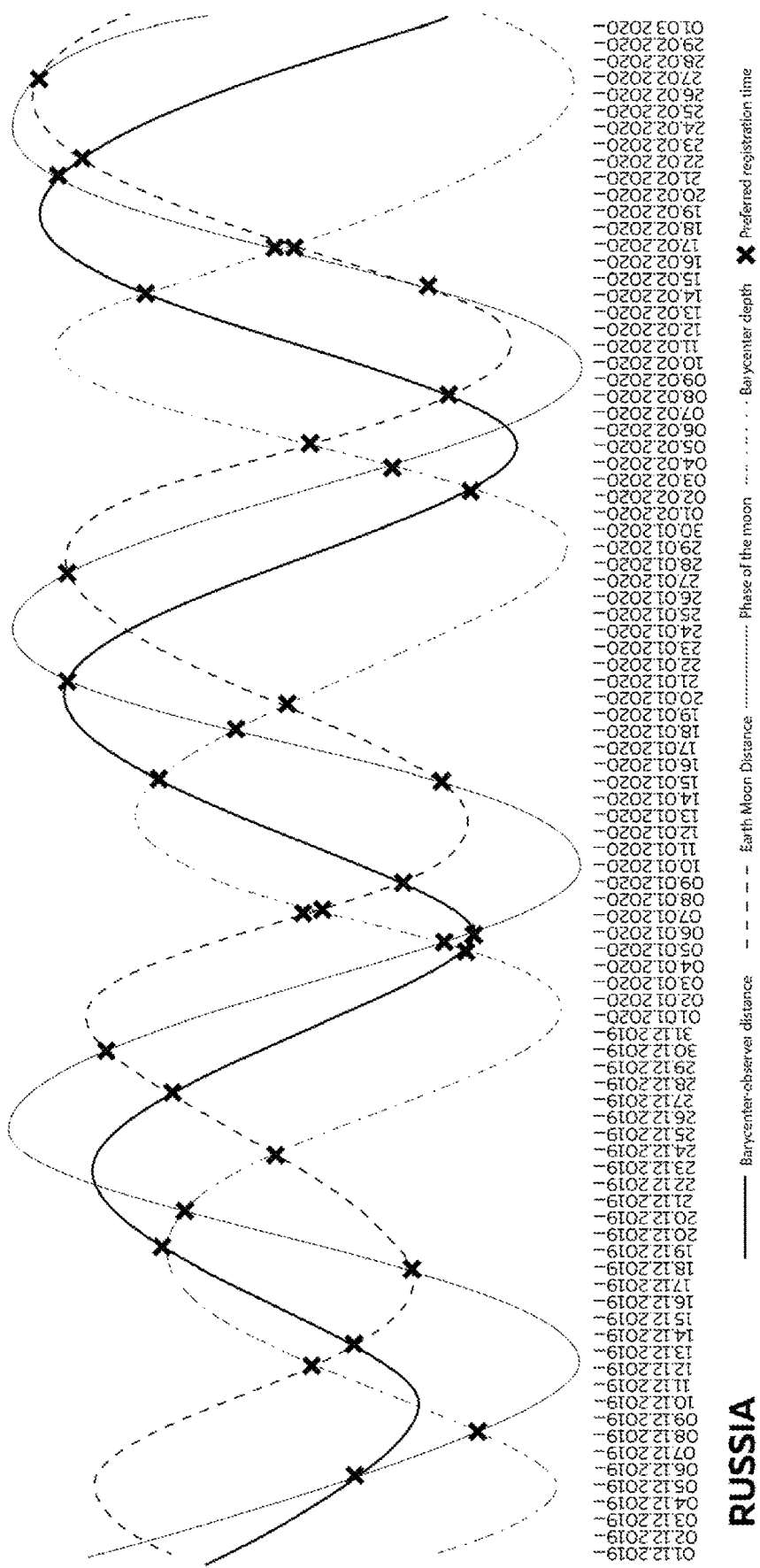
FIGS. 5-8 illustrate various case studies involving the calculation of a gravitational resonance in different exemplary locations.
Figure 6:
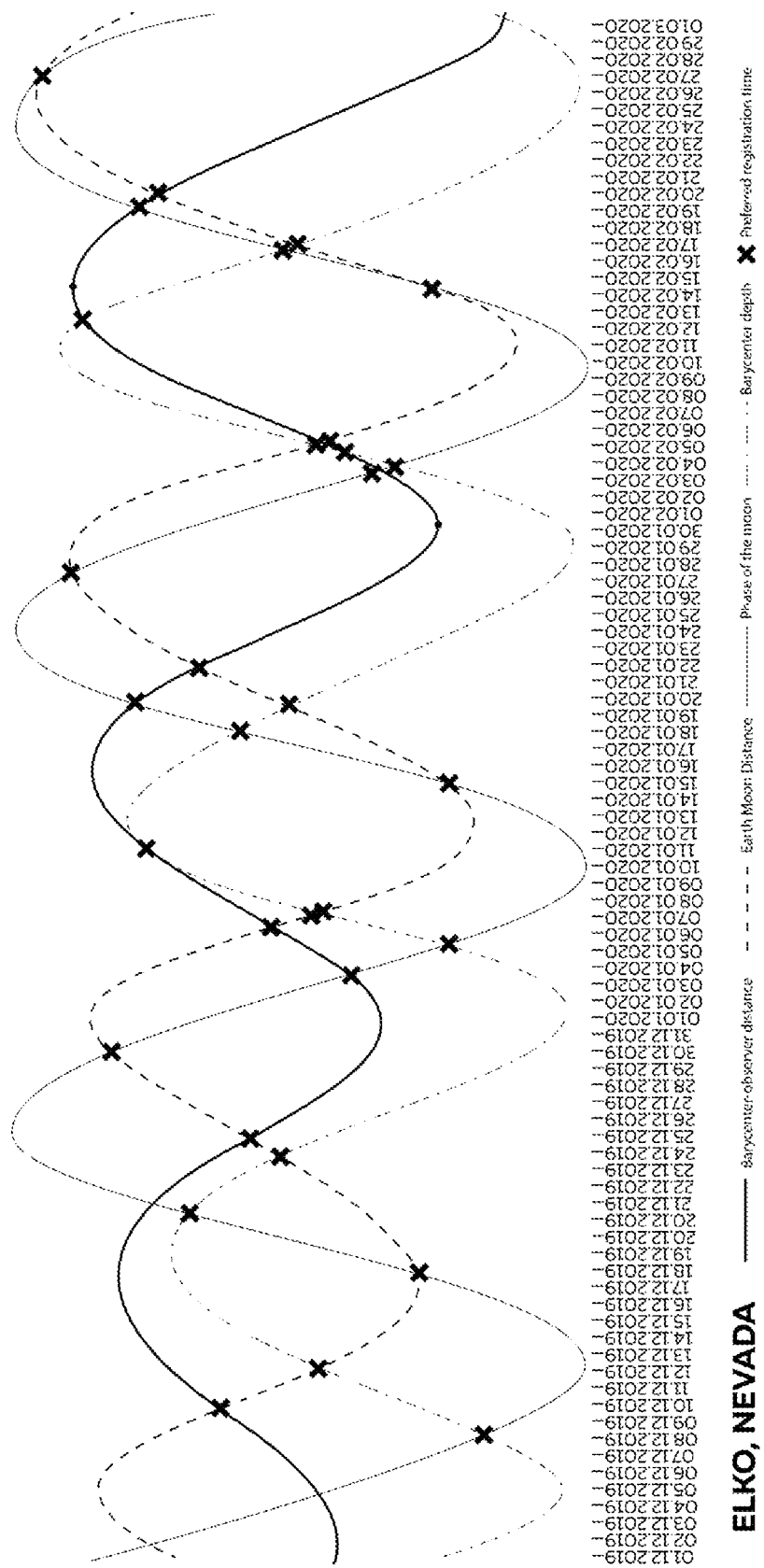
Figure 7:
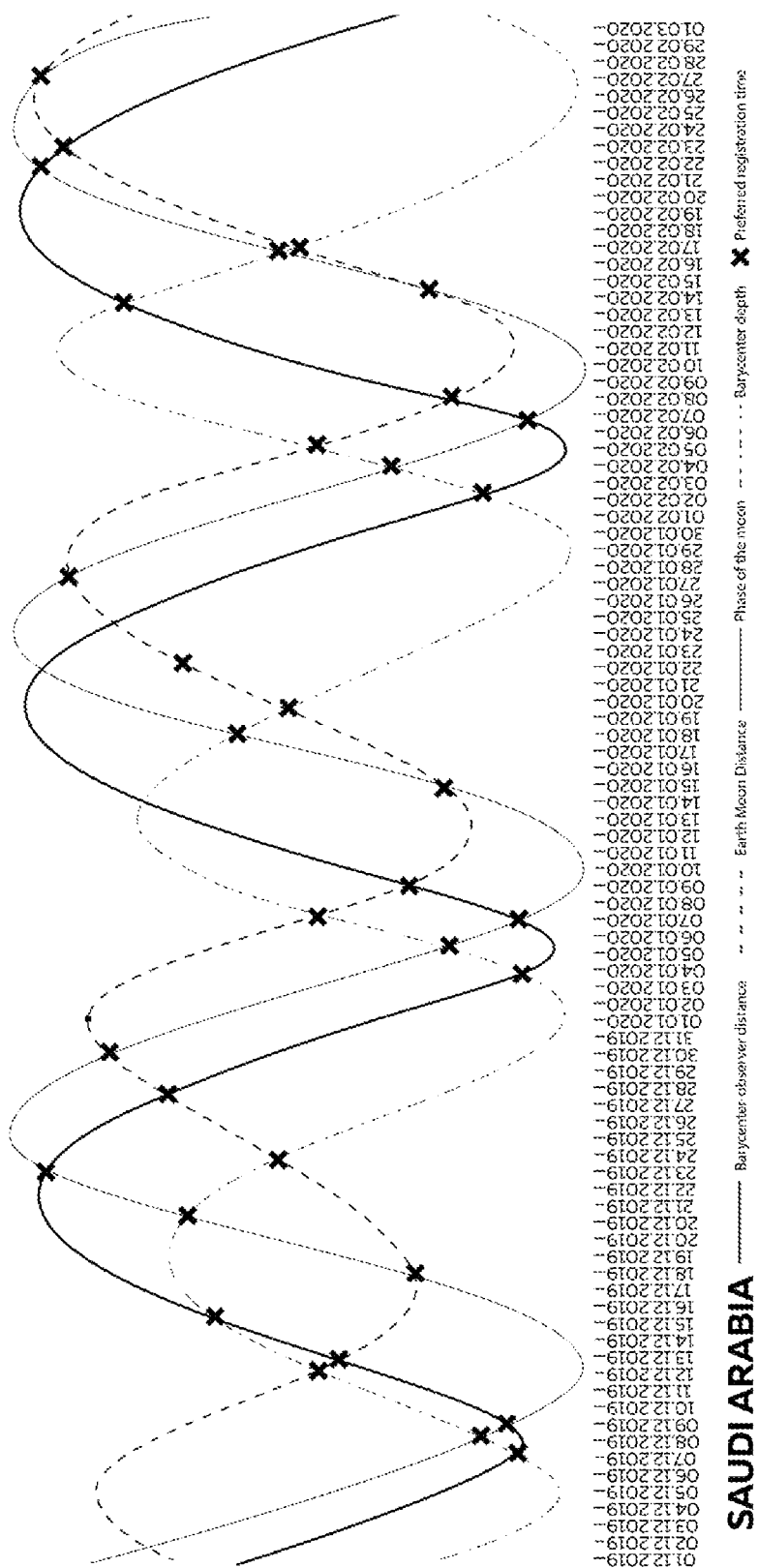
Figure 8:
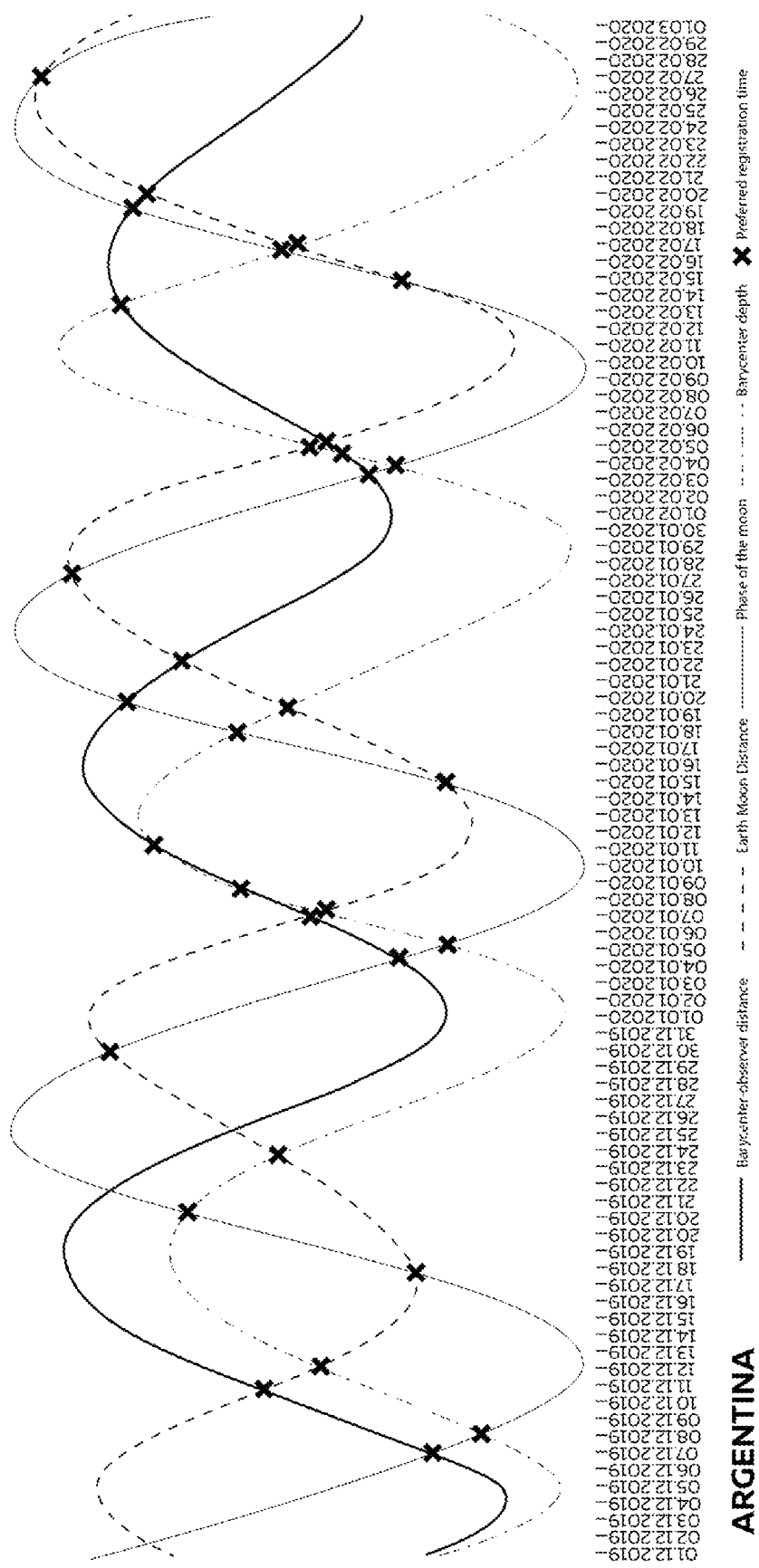

Outputs comprise: (1) L, R, F, and H graphs, with indicated intersection points and minimum/maximum points (as exemplified in FIG. 4).

Steps for the process comprise the following:
1. A user specifies an excel file with dates, then the software loads it. The zones in the file are:
   Date;
   Lat—barycentre latitude;
   Lon—barycentre longitude;
   H—barycentre height;
   dist_R_Curve 1—Earth-Moon distance;
   phase_F—Curve 3—lunar phase, i.e. the moon's visible part;
   baryc_H—Curve 4—barycentre depth.
2. A user sets the observer's position (latitude, longitude) and the boundaries between dates for this particular graph.
3. A calculation of the barycentre-observer distance (B-O) is performed for all the dates in a file:
   a) Barycentre coordinates, X1, Y1, Z1, are calculated (Lat, Lon, and H for the specified date are taken from the excel file);
   b) The observer's coordinates, X2, Y2, Z2, are calculated (Lat and Lon were entered in step 2, and H=0)
   c) The barycentre-observer distance (B-O) is calculated using the following relationship:

$B-O = \text{sq root}((X1-X2)^2 + (Y1-Y2)^2 + (Z1-Z2)^2)$  (Equation 6);

d) The barycentre-observer distance is normalized from zero to one, zero being the minimum distance of all those calculated, and one being the maximum distance of all those calculated.
4. Out of all the data calculated, the data for the desired resonance period are chosen and all four graphs (L, R, F, and H) are shown along the same range of dates, along the same axis, as well as their intersections and minimum/maximum points. Based on the intersections and minimum/maximum points determined, the resonance day can be predicted. The resonance day is predicted by detecting intersections of the four graphs. Any intersection of any one of the four graphs may imply a resonance day or period. For example, in FIG. 4, the following curves are illustrated: (1) distance between moon and earth, (2) moon phase, (3) depth of the Earth-Moon barycentre, (4) distance from the observer (i.e. the location) to the Earth-Moon barycentre. Intersections of the curves, as shown, are potential moments of resonances of 14-day gravitational tides. Minimums and maximums of the curves are used as secondary data. At these moments, the forces acting on solid and liquid material deposits, the forces being a result of the gravitational tides, are at their greatest and thus easier to detect. In other words, such intersections serve as trigger points for the discharge of seismic foci, forming detectable standing waves in oil and gas deposits, which in turn affect geological rock surrounding the deposits. Preferred registration times are intersections between the curve showing the Moon-Earth distance (R) and either the curve showing lunar phase (F) or the curve showing the depth of the barycenter (H). The depth of the barycenter is defined as the distance from the center of mass of the Earth-Moon system to the surface of the Earth. In theory, however, any of the dates matching any intersection of any two curves may be used.

Example 2. One Embodiment which Implements the Algorithm Calculation for Determining the Deposit/Anomaly Location (X, Y, Z)

Inputs comprise: latitude (Lat), longitude (Lon), and height (H).

Outputs comprise: X, Y, and Z, i.e., the coordinates of the deposit.

Steps for the process comprise the following:

The latitude angle is calculated via the following relationship:

$lat1 = (Lat-90)*Pi/180$  (Equation 7);

The longitude angle is calculated using the following relationship:

$lon1 = (Lon+180)*Pi/180$  (Equation 8);

The height change is calculated using the following relationship:

$dH = 6378 - H$  (Equation 9);

X is calculated using the following relationship:

$X = dH*\sin(Lat1)*\cos(Lon1)$  (Equation 10);

Y is calculated using the following relationship:

$Y = dH*\sin(Lat1)*\sin(Lon1)$  (Equation 11);

Z is calculated using the following relationship:

$Z = dH*\cos(Lat1)$  (Equation 12).

From all of the above-calculated data, the data for the necessary period are chosen and all four graphs are shown on the same date and axis, as well as intersections and minimum/maximum points.

Aspects of the invention are as follows. What is claimed is:

A method for locating deposits of mineral resources, comprising predicting an onset of a 14-day gravitational tide resonance at a location, deploying an array of gas analyzers along the Earth's surface at the location, the gas analyzers being configured to detect element vapor emissions from the Earth's crust during the 14-day gravitational tide resonance, during an observation period of the 14-day gravitational tide resonance, recording the element vapor emissions from the Earth's crust using said gas analyzers, analyzing the recorded element vapor emissions and determining whether the emission indicates a presence of a mineral deposit by measuring a change of an amplitude of the element vapor emissions during the resonance, and, if indicated to be present, determining the location of the mineral deposit.

In some aspects, the method further comprises: deploying an array of chromatographs along the Earth's crust at the given location, during the observation period of the resonance, recording an electrochemical potential using the chromatographs, and measuring a change in the electrochemical potential, the change being further indicative of a presence of a mineral deposit.

In some aspects, the observation period of the resonance comprises one day before, during, and one day after the 14-day gravitational tide resonance. In some aspects, the array of gas analyzers comprises a checkrow pattern. In some aspects, the gas analyzers are arranged equidistant to one another.

In some aspects, the method further comprises: generating a map correlating geographic locations, geochemical anomalies determined, and mineral deposit locations found; or during the observation period of the resonance, recording vapor emissions of one or more accessory minerals related to the mineral deposit using one or more additional gas analyzers.

In some aspects, the one or more accessory minerals comprise sulphide.

In some aspects, the method further comprises determining a type of the mineral deposit indicated by comparing a geochemical anomaly during the resonance to a set of previously recorded geochemical anomaly casts from a database.

In some aspects, the element vapor emissions comprise mercury and the mineral deposit comprises gold, and the gas analyzers measure a mass concentration of mercury vapors, the mass concentration ranging from zero to 20,000 ng/m$^3$.

In some aspects, the element vapor emissions comprise methane and the mineral deposit comprises oil and/or gas, and the gas analyzers measure a mass concentration of methane vapors, the mass concentration being 500 ng/m3 or higher.

In some aspects, the location comprises an area of four square miles, the pitch between gas analyzers is 20 meters, and the array of gas analyzers comprises up to 10,000 gas analyzers.

In some aspects, the method comprises installing one additional gas analyzer as a reference point, said one additional gas analyzer setting a single scale for the recorded element vapor emissions received from the array of gas analyzers.

In some aspects, additional steps comprise performing an appraisal survey, the appraisal survey comprising an additional array of gas analyzers spaced 100 meters apart, the appraisal survey being used for further prospecting of mineral deposits in other locations.

In some aspects, the gas is mercury and said analyzing comprises calculating a geochemical dispersion halo using the following relationship:

$$M_X = b \int_{X_1}^{X_2} \frac{e^{-a/X}}{X} dX.$$

In some aspects, the method further comprises deploying an additional array of recording devices along the Earth's crust at the given location, during the observation period of the resonance, recording a signal using the additional array of recording devices, and measuring a change in the recorded signal, the change being further indicative of a presence of a mineral deposit, wherein the additional array of recording devices comprises one or more of: magnetometers, radiation analyzers, spectrometers, and/or gravimeters.

Within the scope of the invention is firmware, hardware, software and computer readable-media including software which is used for carrying out and/or guiding the methodologies described herein, particularly with respect to radioactive (and nuclear) threat detection. Hardware optionally includes a computer, the computer optionally comprising a processor, memory, storage space and software loaded thereon. The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. When used in the following claims, the terms "comprises", "includes", "have" and their conjugates mean "including but not limited to". The scope of the invention is limited only by the following claims.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for locating deposits of mineral resources, comprising:
   predicting an onset of a 14-day gravitational tide resonance at a location,
   deploying an array of gas analyzers along the Earth's surface at the location, the gas analyzers being configured to detect element vapor emissions from the Earth's crust during the 14-day gravitational tide resonance,
   during an observation period of the 14-day gravitational tide resonance, recording the element vapor emissions from the Earth's crust using said gas analyzers,
   analyzing the recorded element vapor emissions and determining whether the emission indicates a presence of a mineral deposit by measuring a change of an amplitude of the element vapor emissions during the resonance, and
   if indicated to be present, determining the location of the mineral deposit.

2. The method of claim 1, further comprising:
   deploying an array of chromatographs along the Earth's crust at the given location,
   during the observation period of the resonance, recording an electrochemical potential using the chromatographs, and
   measuring a change in the electrochemical potential, the change being further indicative of a presence of a mineral deposit.

3. The method of claim 1, wherein the observation period of the resonance comprises one day before, during, and one day after the 14-day gravitational tide resonance.

4. The method of claim 1, wherein the array of gas analyzers comprises a checkrow pattern.

5. The method of claim 4, wherein the gas analyzers are arranged equidistant to one another.

6. The method of claim 1, further comprising:
generating a map correlating geographic locations, geochemical anomalies determined, and mineral deposit locations found.

7. The method of claim 1, further comprising:
during the observation period of the resonance, recording vapor emissions of one or more accessory minerals related to the mineral deposit using one or more additional gas analyzers.

8. The method of claim 7, wherein the one or more accessory minerals comprise sulphide.

9. The method of claim 1, further comprising:
determining a type of the mineral deposit indicated by comparing a geochemical anomaly during the resonance to a set of previously recorded geochemical anomaly casts from a database.

10. The method of claim 1, wherein the element vapor emissions comprise mercury and the mineral deposit comprises gold.

11. The method of claim 10, wherein the gas analyzers measure a mass concentration of mercury vapors, the mass concentration ranging from zero to 20,000 ng/m$^3$.

12. The method of claim 1, wherein the element vapor emissions comprise methane and the mineral deposit comprises oil and/or gas.

13. The method of claim 12, wherein the gas analyzers measure a mass concentration of methane vapors, the mass concentration being 500 ng/m$^3$ or higher.

14. The method of claim 1, wherein the location comprises an area of four square miles.

15. The method of claim 14, wherein the pitch between gas analyzers is 20 meters.

16. The method of claim 15, wherein the array of gas analyzers comprises up to 10,000 points of detection.

17. The method of claim 1, further comprising:
installing one additional gas analyzer as a reference point, said one additional gas analyzer setting a single scale for the recorded element vapor emissions received from the array of gas analyzers.

18. The method of claim 1, further comprising:
performing an appraisal survey, the appraisal survey comprising an additional array of gas analyzers spaced 100 meters apart, the appraisal survey being used for further prospecting of mineral deposits in other locations.

19. The method of claim 1, wherein the gas is mercury and said analyzing comprises calculating a geochemical dispersion halo using the following relationship:

$$M_X = b \int_{X_1}^{X_2} \frac{e^{-aX}}{X} dX.$$

20. The method of claim 1, further comprising:
deploying an additional array of recording devices along the Earth's crust at the given location,
during the observation period of the resonance, recording a signal using the additional array of recording devices, and
measuring a change in the recorded signal, the change being further indicative of a presence of a mineral deposit,
wherein the additional array of recording devices comprises one or more of: magnetometers, radiation analyzers, spectrometers, and/or gravimeters.

* * * * *